(No Model.)
C. GRACEY.
COFFEE AND TEA POT STAND.
No. 312,200. Patented Feb. 10, 1885.
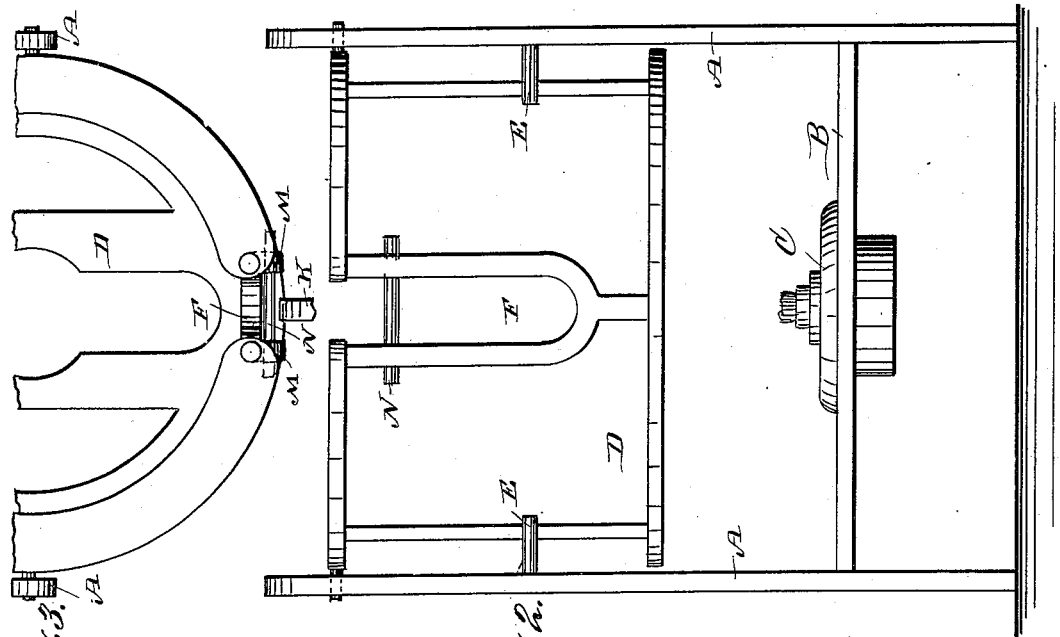
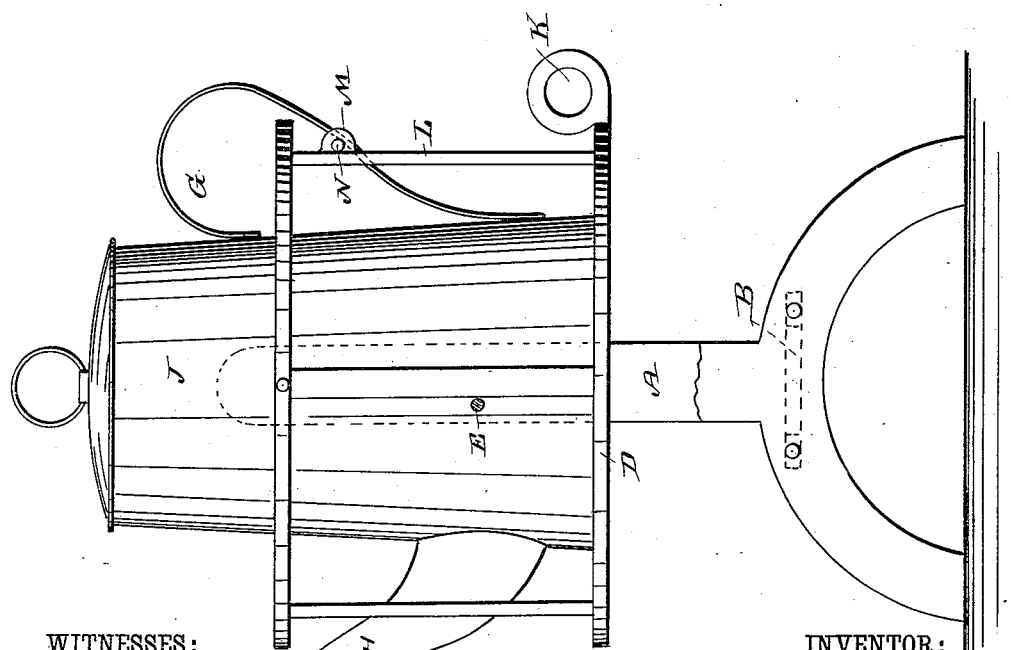
WITNESSES:
Theo. G. Hoster
C. Sedgwick
INVENTOR:
C. Gracey
BY Munn & Co
ATTORNEYS.

UNITED STATES PATENT OFFICE.

CHARLIE GRACEY, OF SUMMIT, MISSISSIPPI.

COFFEE AND TEA POT STAND.

SPECIFICATION forming part of Letters Patent No. 312,200, dated February 10, 1885.

Application filed August 19, 1884. (No model.)

*To all whom it may concern:*

Be it known that I, CHARLIE GRACEY, of Summit, Pike county, Mississippi, have invented a new and Improved Coffee and Tea Pot Stand, of which the following is a full, clear, and exact description.

The object of my invention is to provide a new and improved stand for holding a tea or coffee pot, which stand is so constructed that it holds the pot securely and greatly facilitates tilting it.

The invention consists in the combination, with two standards, of a basket pivoted between them, which basket has front and rear slots for receiving the spout and handle of the pot, and has apertured lugs, through which a pin can be passed, which is also passed through the pot-handle to hold the pot in place. A lamp can be held in the cross-piece of the standards.

Reference is to be had to the accompanying drawings, forming part of this specification, in which similar letters of reference indicate corresponding parts in all the figures.

Figure 1 is a side view of my improved coffee and tea pot stand, showing the manner of holding the pot. Fig. 2 is a front view of the same, and Fig. 3 is a plan view of part of the same.

Two standards, A, having suitable legs or bars, are united by a cross-piece, B, provided with a recess or aperture for receiving a lamp, C. Between the upper parts of the standards A a basket, D, is pivoted at its upper edge, so as to be adapted to swing between the standards A, which are provided with suitable stop-pieces, E, to check the rocking or swinging movement of the basket. The basket has vertical front and rear slots, F, or other apertures, through which the handle G and the spout H of the pot J can project. On the bottom of the basket a handle, ring, or loop, K, is formed for tilting the basket.

On the uprights L, at the rear slot, F, apertured jaws M are formed, through which a pin, N, is passed, which also passes through the handle G, thus holding the pot in place in the basket. The pot is placed in the basket, and by tilting the basket the pot is tilted, thus facilitating the pouring out of coffee, &c.

The coffee or tea can be kept hot by the lamp C.

Having thus described my invention, I claim as new and desire to secure by Letters Patent—

1. The combination, with the standards A, of the basket D, pivoted between them, and provided with the front and rear upright slots or apertures, F, substantially as herein shown and described.

2. The combination, with the standards A, of the pivoted basket D, having front and rear slots, F, the apertured jaws M, and the pin N, substantially as herein shown and described.

CHARLIE GRACEY.

Witnesses:
 J. R. SAMPLE,
 C. E. FENNISSON.